United States Patent [19]

Arledge

[11] Patent Number: 4,756,120
[45] Date of Patent: * Jul. 12, 1988

[54] GRAVITY FEED HYDROPONIC SYSTEM

[76] Inventor: James M. Arledge, 3100 Cypress St., West Monroe, La. 71291

[*] Notice: The portion of the term of this patent subsequent to Mar. 11, 2003 has been disclaimed.

[21] Appl. No.: 838,124

[22] Filed: Mar. 10, 1986

Related U.S. Application Data

[63] Continuation-in-part of Ser. No. 663,400, Oct. 22, 1984, Pat. No. 4,574,520.

[51] Int. Cl.$^4$ .................................................. A01G 31/00
[52] U.S. Cl. ............................................. 47/59; 47/82
[58] Field of Search ............ 47/82, 83, 62, 45, 65, 47/64, 71, 59, 78, 63; 249/206; 239/499, 498, 524

[56] References Cited

U.S. PATENT DOCUMENTS

| | | | |
|---|---|---|---|
| 1,217,239 | 2/1917 | Swartz | 47/82 X |
| 1,752,597 | 4/1930 | Jackson | 47/83 |
| 2,152,869 | 4/1939 | Campbell | 47/82 |
| 4,065,876 | 1/1978 | Moffett | 47/83 |
| 4,177,604 | 12/1979 | Friesen | 47/62 |
| 4,216,617 | 8/1980 | Schmidt | 47/82 X |
| 4,218,847 | 8/1980 | Leroux | 47/82 X |
| 4,268,994 | 5/1981 | Urai | 47/82 X |
| 4,295,296 | 10/1981 | Kinghorn | 47/82 |
| 4,380,136 | 4/1983 | Karpisek | 47/83 |
| 4,392,328 | 7/1983 | Walker | 47/62 |
| 4,419,843 | 12/1983 | Johnson | 47/82 |
| 4,454,684 | 6/1984 | O'Hare | 47/82 |
| 4,574,520 | 3/1986 | Arledge | 47/59 |

OTHER PUBLICATIONS

Advertisement, *Rolling Stone Magazine*, Oct. 27, 1983.

Primary Examiner—Robert A. Hafer
Assistant Examiner—Danton D. DeMille
Attorney, Agent, or Firm—Bernard, Rothwell & Brown

[57] ABSTRACT

A system for hydroponically growing plants in a vertical array includes a vertical cylindrical column made up of stacked column sections adapted to contain an inert support material, the column sections including top and bottom openings and a plurality of side apertures. A nutrient reservoir is provided for positioning above the column and adapted to contain a nutrient solution. The introduction of nutrient solution into the column is controlled by an adjustable valve supported above the top opening of the column for gravity feed of nutrient solution into the column. The valve is positioned to permit visual inspection of the rate of introduction of nutrient solution through the valve and into the column. A conduit connects the valve to the nutrient reservoir.

13 Claims, 7 Drawing Sheets

GRAVITY FEED HYDROPONIC SYSTEM

BACKGROUND OF THE INVENTION

1. Cross-Reference to Related Applications

This application is a continuation-in-part of copending prior application Ser. No. 663,400, filed Oct. 22, 1984 now U.S. Pat. No. 4,574,520.

2. Field of the Invention

The present invention relates to a hydroponic system for growing plants in vertical pipes.

3. Description of the Background Art

The use of columns for growing plants in a vertical array is well known in the art. Generally, the columns are cylindrical and contain a substrate material for root support. A plurality of side holes or apertures are provided in the columns through which plants grow from the substrate material, the branches of the plants extending outwardly from the columns.

The substrate material may contain nutrients as disclosed in U.S. Pat. No. 4,231,189. However, depletion of the nutrient supply requires replacement of the substrate and/or addition of fresh nutrients, e.g., by addition of fertilizer.

The use of vertical columns in hydroponic systems is also known. See U.S. Pat. No. 4,454,684. In a hydroponic system, the substrate material in the column is generally inert, and nutrients in solution are added to the substrate material.

Water and/or nutrient solution is generally introduced into the substrate material at the top of the column. The fluid moves generally downwardly through the column and excess fluid drains out of the column through a column bottom opening. The drainage fluid may then be discarded, or recycled through the column by means which may include, for example, a pump.

Because the drainage fluid may contain valuable nutrients, it is wasteful and relatively more expensive to discard drainage fluid than to recycle it. On the other hand, recycling fluid increases the risk of disease development, and contamination of the entire nutrient supply as well as the substrate material in the column and all the plants growing therein.

There thus remains a need in the art for a hydroponic system which minimizes the waste of nutrient solution without requiring recycling of drainage liquid.

SUMMARY OF THE INVENTION

In accordance with the present invention, a system for hydroponically growing plants in a vertical array comprises a vertical cylindrical column comprising a plurality of stackable cylindrical column sections including a column top section and a column bottom section. Each section is adapted to contain an inert support material. Each section includes top and bottom portions and a plurality of side apertures, the top portion of each section defining a top opening of a column section and the bottom portion of each section defining a bottom opening of a column section. The bottom portion of each section includes a screen for containing inert support material within the section and for preventing roots from growing outside the section through the bottom opening of the section. The bottom portion of each section further includes a screen support for supporting the screen at the bottom of the section and for supporting roots within the section, the top portion of each section being adaptable to mate with and support a bottom portion of an adjacent section. The bottom portion of each section is adapted to mate with the top portion of an adjacent section. A nutrient reservoir is provided for positioning above the column and adapted to contain a nutrient solution. A column cap having a passageway therethrough is provided, the cap being adapted to mate with the top portion of the column top section and to cover the top opening of the column top section to restrict evaportion of nutrient solution therethrough. Means are provided for supporting the nutrient reservoir above the column cap. An adjustable valve having an inlet and an outlet for controlling the rate of introduction of nutrient solution into the column is provided, the inlet of the valve being connected to the nutrient reservoir. The valve is mounted on the column cap by means including a hollow pipe at least a portion of which pipe is transparent, the pipe connecting the outlet of the valve with the passageway in the column cap to restrict evaporation of nutrient solution through the passageway in the column cap. The valve is adjustable to control regularly timed drips of nutrient solution into the column, the pipe permitting unrestricted passage of nutrient solution from the valve through the passageway in the cap to permit accurate timing of the drips of nutrient solution and gravity feed of nutrient solution into the column. The transparent portion of the pipe permits visual inspection of the rate of introduction of nutrient solution from the valve into the column.

DETAILED DESCRIPTION OF THE PREFERRED EMBODIMENT

Figure 1:
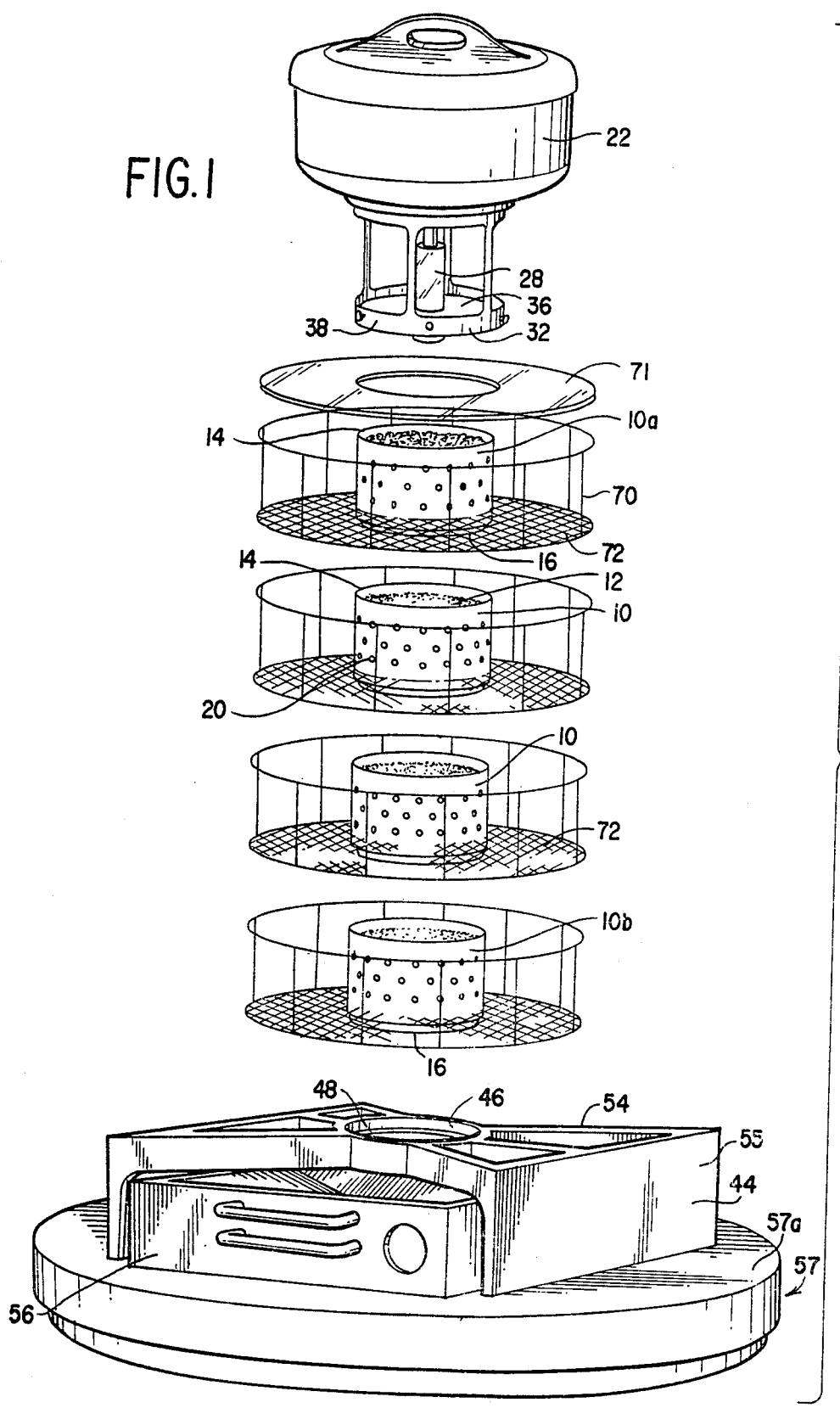
FIG. 1 is an exploded perspective view of a column, reservoir and base in accordance with the present invention.
Figure 4:
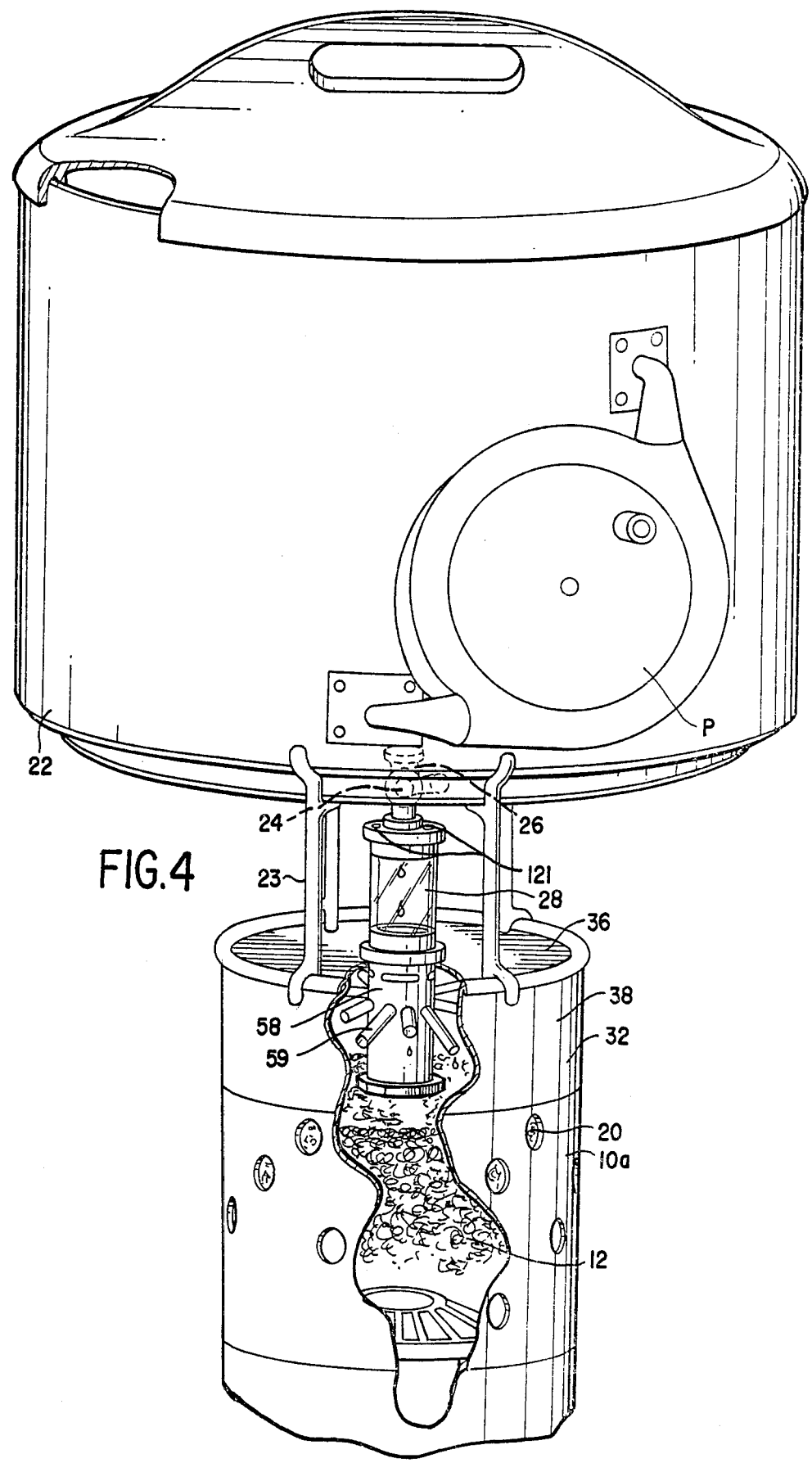
FIG. 4 is a perspective view with portions broken away of top column sections and nutrient reservoir.

With reference to FIGS. 1 and 4, a hydroponic system according to the invention includes a vertical cylindrical column comprised of a plurality of stackable cylindrical column sections 10 adapted to contain an inert support material 12. The column includes a column top section 10a and a column bottom section 10b. Each column section 10 includes a top opening 14 through which nutrient solution may be introduced into the inert support material 12, and a bottom opening 16 which permits nutrient solution to pass from one column section to an adjacent column section or, out of the column. The bottom opening 16 of each column section is covered by a porous mesh screen material 18 having pores which are sufficiently large to permit fluid passage therethrough, yet sufficiently small to prevent the support material from passing out of a column section 10 through bottom opening 16. See FIG. 7. A screen support 102 supports a screen at the bottom of each section 10, and supports roots within each section 10. Screen support 102 is supported within a column section 10 by rim 126. See FIG. 9.

The support material 12 is preferably inert and may be comprised of various granular and fibrous materials as is known in the art. The support material may include porous plastic meshes or particles of, for example, styrofoam or polyurethane, and/or may include such inert materials as nylon filaments, perlite and fiberglass filaments.

The column sections 10 include a plurality of side apertures 20 through which plants may grow. See FIGS. 1 and 4. The purpose of the support material is to support seeds in the vicinity of an aperture 20 during germination, to support the roots of plants growing through the apertures 20, and to provide a means for delivering fluid and nutrients to seedlings and to the roots of growing plants.

A nutrient reservoir 22 is provided for positioning above the top column section 10a. The nutrient reservoir 22 is adapted to contain a nutrient solution, e.g., water and conventional plant foods. The reservoir 22 may be supported above top column section 10a by any suitable means such as legs 23 connecting reservoir 22 with a column cap 32. If necessary, a pump P can be provided for circulation and re-mixing of nutrient solutions which are prone to separating.

Means are also provided for controlling the introduction of nutrient solution into the column 10 from the nutrient reservoir 22. These means include an adjustable valve 24 which is connected to the nutrient reservoir 22 by conduit 26. See FIGS. 4 and 5.

Means are provided for supporting valve 24 above the top opening of top column section 10a for gravity feed of nutrient solution into the column. See FIGS. 1, 4 and 5. These means include a hollow pipe 28 connecting valve 24 with a generally centrally located opening in column cap 32. Hollow pipe 28 is adapted to permit unrestricted flow of liquid therethrough from valve 24. At least a portion of pipe 28 is transparent, permitting visual inspection of the rate of fluid flow from valve 24 through pipe 28. A top portion of pipe 28 includes air vents 121.

Valve 24 is adjustable to control regularly timed drips of nutrient solution into column top section 10a.

Cap 32 includes a disc-shaped top portion 36 and a rim portion 38 attached to and extending downwardly from the periphery of the top portion 36. The rim and top portions of cap 32 are adapted to mate with and cover the top opening of column top section 10a. This arrangement permits nutrient solution to flow into column top section 10a from the nutrient reservoir 22 through conduit 26, valve 24 and hollow pipe 28, with visual inspection of the rate of flow through pipe 28. Cap 32 also serves to restrict evaporation of nutrient solution through top opening 14 of column top section 10a.

Figure 2:
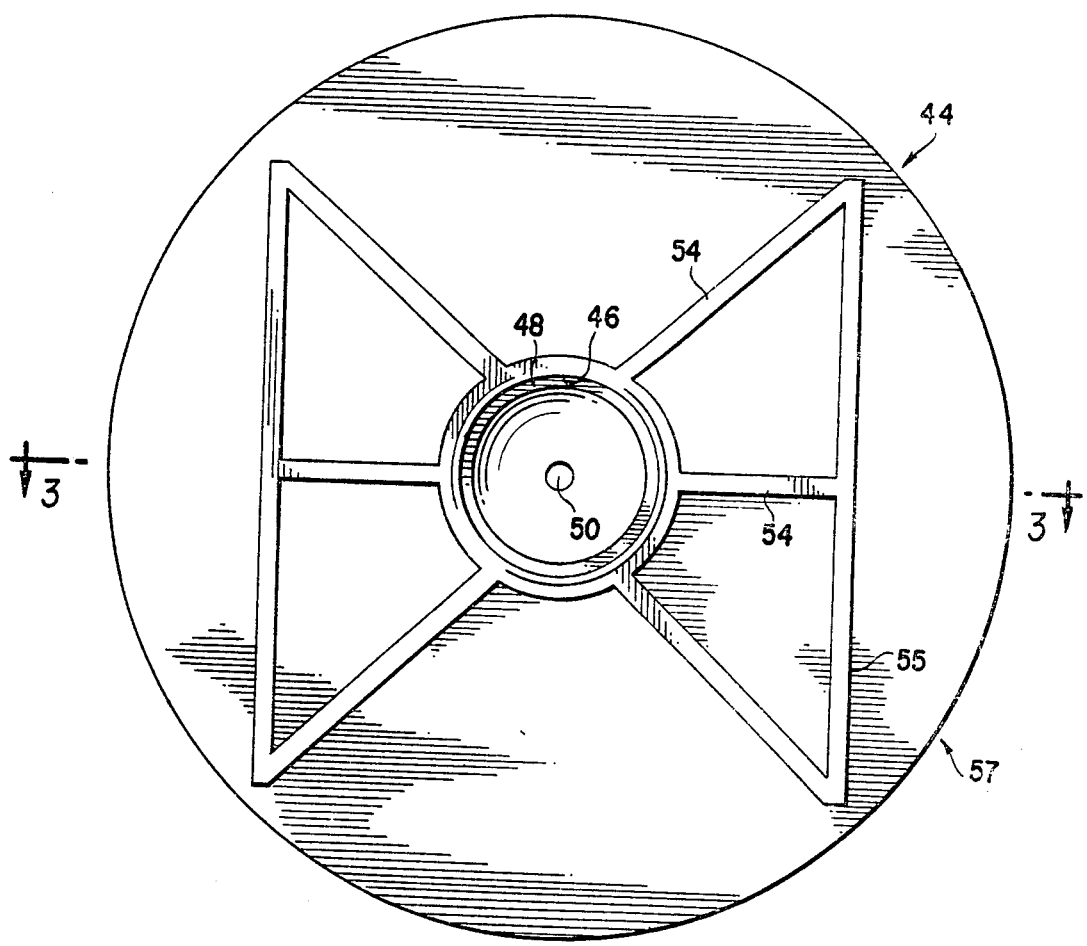
FIG. 2 is an elevational view of the top of the column base.
Figure 3:
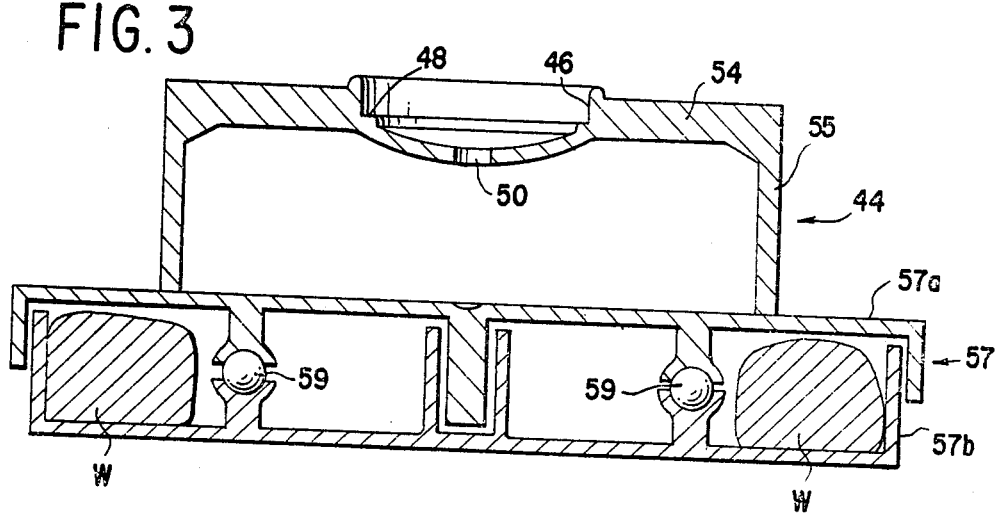
FIG. 3 is a cross-sectional view taken along line 3—3 of FIG. 2.

A column formed of stacked column sections 10 is supported in a vertical position by means of a column base 44. See FIGS. 1, 2 and 3.

Base 44 preferably includes a vertical cylindrical rim 46 having an inner diameter sized to complementarily fit around the outside of and mate with a bottom portion of bottom column section 10b. A bearing portion 48, is connected to and supported by the rim 46, and protrudes inwardly from a bottom portion of rim 46. The bearing portion 48 is adapted to rest against and support the column when the bottom portion of bottom column section 10b is in mating position with rim 46. The base 44 includes an aperture 50 permiting drainage of excess nutrient solution from the stacked column. Rim supports 54, are attached to the outer surface of rim 46 and extend outwardly from rim 46 to connect with support legs 55, and thereby support the column above rotating base member 57.

Rotating base member 57 includes a top portion 57a and a bottom portion 57b, the bottom portion 57b supporting the top portion 57a by bearing means such as ball bearings 59 permitting rotation of portion 57a and stacked column sections with respect to base portion 57b. Rotating base member 75 can be rotated to regulate distribution of light to the column, and can be rotated by hand, or by a low rpm motor or wind up mechanism. Weights W may be provided in base member 75 to further stabilize the column.

According to one embodiment, means are provided for collecting nutrient solution draining from the stacked column through the bottom opening 16 in the bottom column section 10b. This means may include a collection reservoir 56 adapted to fit beneath the column. According to a preferred embodiment, rim supports 54 and legs 55 of support base 44 provide space for collection reservoir 56 beneath to bottom column section 10b. The collection reservoir 56 and base 44 are adapted to permit access to the collection reservoir and removal of the collection reservoir from beneath the column.

Figure 5:
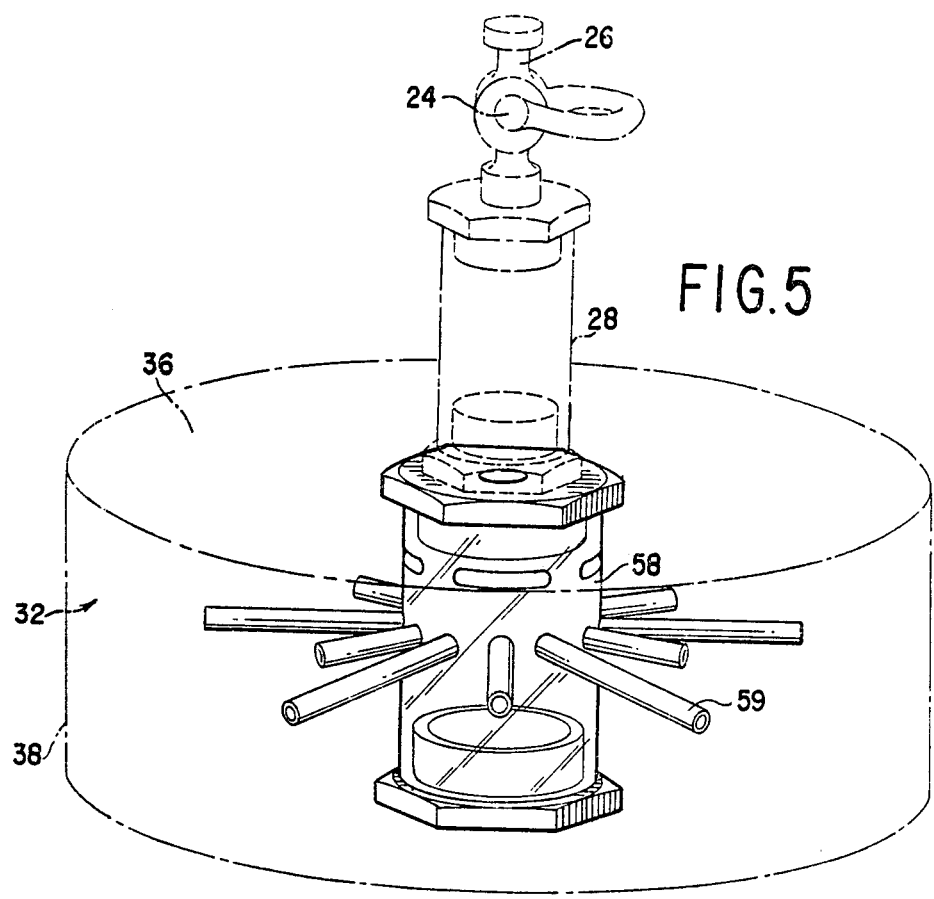
FIG. 5 is a perspective view of a nutrient valve and dispersion system according to the invention.
Figure 6:
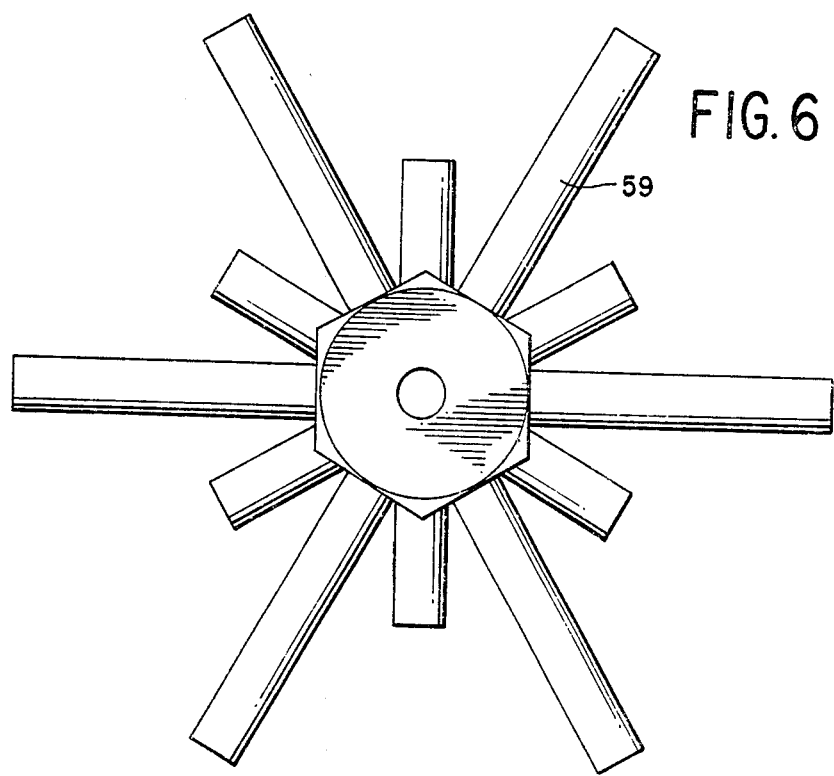
FIG. 6 is a top elevational view of the nutrient dispersion system shown in FIG. 5.

With reference to FIGS. 4, 5 and 6, the system includes a nutrient solution dispersion conduit array including nutrient collection container 58 and peripheral dispersion tubes 61. The nutrient solution dispersion conduit array provides for generally even distribution of nutrient solution to the inert support material 12 in the column.

Plant support cage sections 70 may be provided to support heavily laddened woody-stemed plants, and/or to confine plant growth to a limited area. See FIG. 1. A transparent cage cover 71 is provided above a cage section surrounding top column section 10a. Adjacent support cage sections 70 can be separated by screens 72, or preferably by transparent plastic covers 71 as is shown above the top column section 10a in FIG. 1. Support cage sections 70 are in the general shape of a vertical cylinder having a diameter substantially larger than the cylindrical column sections 10, and a vertical length about equal to the vertical length of a column section 10. Support cage sections 70 are adapted to be positioned outside column sections 10 and generally concentrically therewith.

Figure 7:
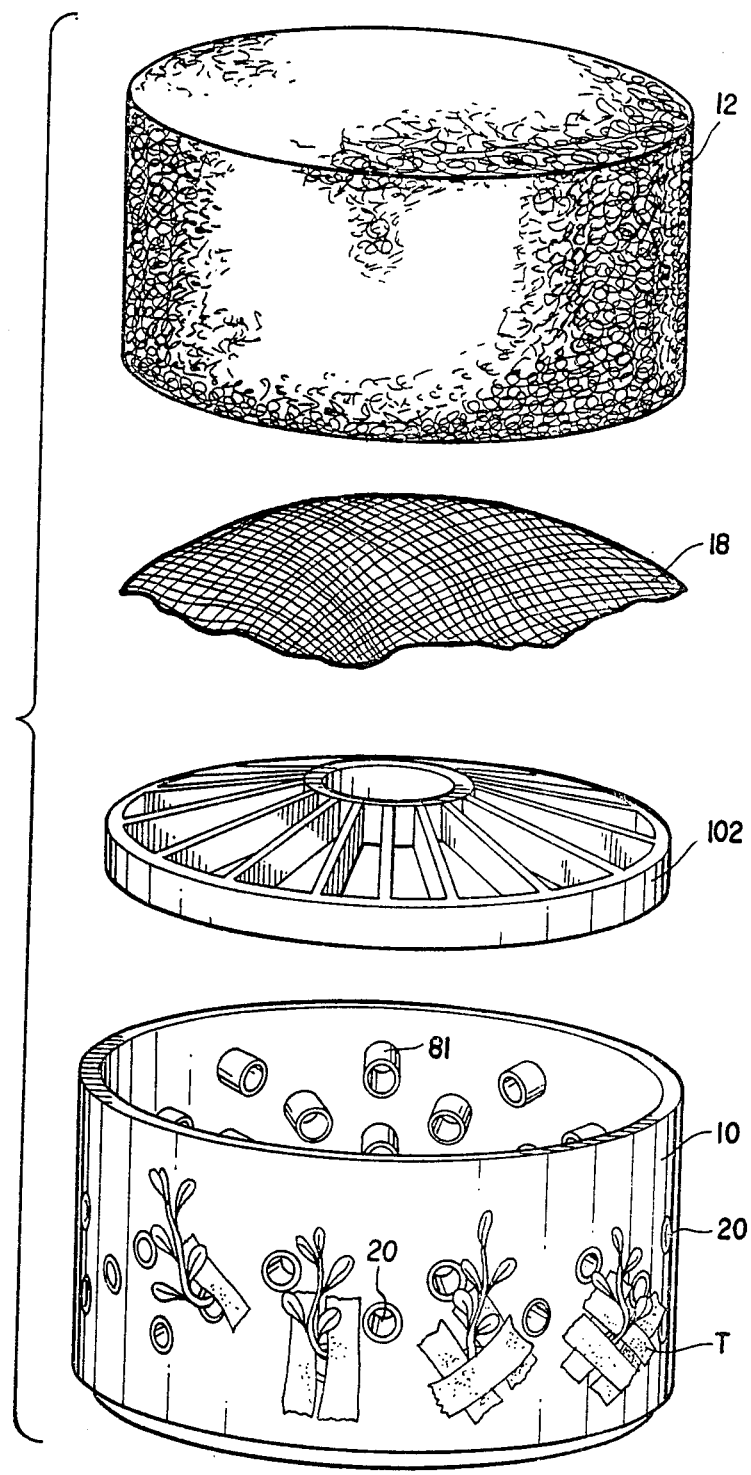
FIG. 7 is an exploded view of a single column section.
Figure 8:
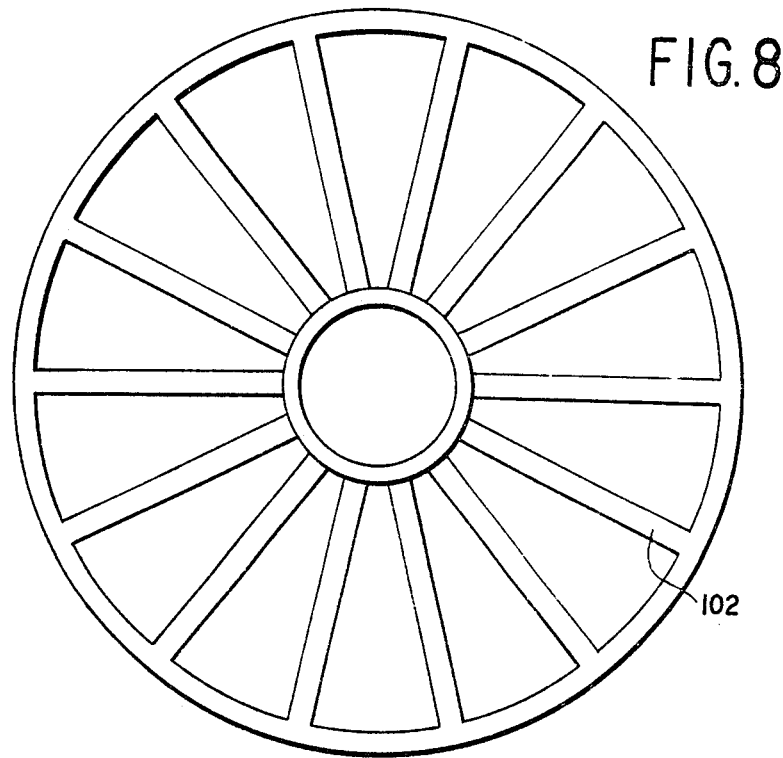
FIG. 8 is a top elevational view of a screen support for a column section.
Figure 9:
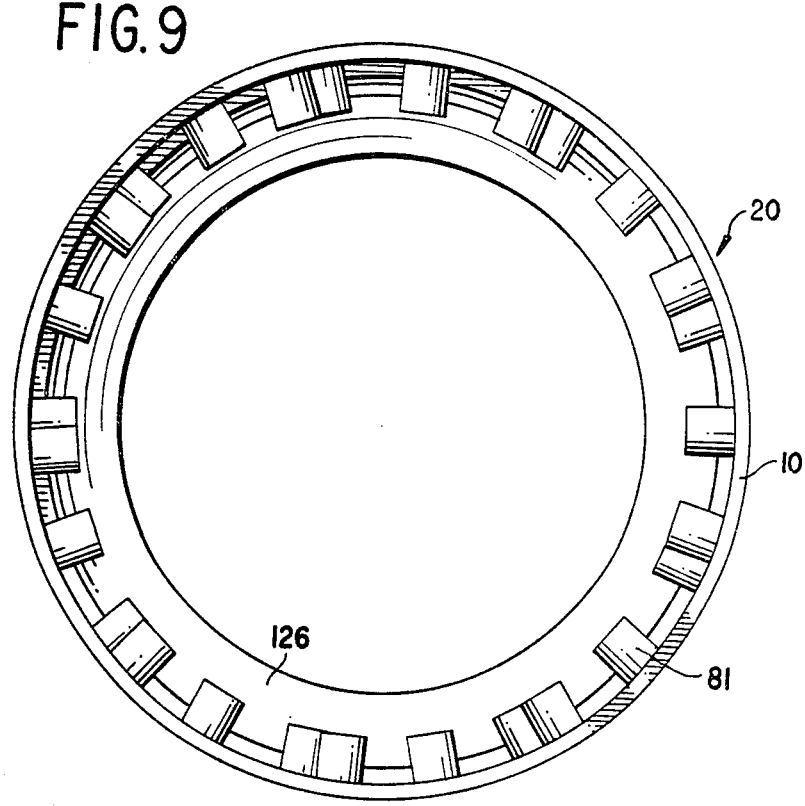
FIG. 9 is a top elevational view of a column section.
Figure 10:
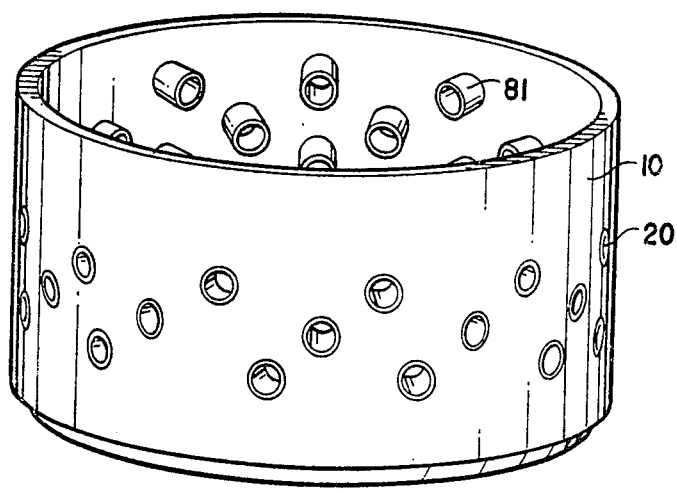
FIG. 10 is a perspective view of a column section.

With reference to FIGS. 7, 9 and 10, each aperture 20 of column 10 is fitted with a short length of hollow support pipe 81 having an outer diameter sized to fit complementarily within and mate with apertures 20. The hollow support pipes 81 are mounted within apertures 20, extending a short distance within a column section 10. The pipes 81 provide support for plants growing through the support pipes from column sections 10 and restricts evaporation. In arid climates, evaporation can further be restricted by strips of tape partially covering apertures 20 as shown in FIG. 7.

According to one embodiment, the system includes a plurality of columns fed by a single reservoir 22, as disclosed in my copending application Ser. No. 663,400, filed Oct. 22, 1984, incorporated herein by reference. According to this embodiment, each column is comprised of individual segments 10 as described herein. Such a multiple column arrangement is suitable for commercial greenhouses and the like.

According to the method of the invention, plants are grown hydroponically in a column by controlling the rate of continuous introduction of nutrient solution into the root support material. Saturation of the inert support material may generally be achieved by adjusting valve 24 so that nutrient solution drips from the valve. The drip rate may be adjusted by the valve to regulate the amount of nutrient solution entering the column.

Transparent tube 28 permits timing of the drips, and thus provides an accurate means for measuring the rate of nutrient flow into the column. The rate of introduction of nutrient solution into the root support material is controlled by adjusting the flow of nutrient solution to maintain substantially all of the root support material in a moist condition without substantial drainage of nutrient solution from the column through the bottom opening of the column. This is accomplished by opening the valve to a position wherein nutrient solution drips into the column at a rate sufficient to saturate the inert support material and to cause excess nutrient solution to drain from the column through the bottom opening of the column. Valve 24 is then adjusted to reduce the flow of nutrient solution to a point where substantially all of the inert support material remains moist, but there is no substantial drainage of nutrient solution from the column. The moistness of the inert support material can be periodically checked through apertures 20 in the column.

Periodically, the positions of column sections 10 are rotated along the column to change the order of the sections, e.g., by moving the bottom section 10b to the position of column top section 10a and so on, to provide for even growth of the plants on the column. The column is also rotated periodically along the column axis in, for example, 90° or 180° increments for even light distribution.

Since many modifications, variations and changes in detail may be made to the described embodiment, it is intended that all matter in the foregoing description and shown in the accompanying drawings be interpreted as illustrative and not in a limiting sense.

What is claimed is:

1. A system for hydroponically growing plants in a vertical array comprising:

(a) a vertical cylindrical column comprising a plurality of stackable cylindrical column sections including a column top section and a column bottom section, each section adapted to contain an inert support material, each section including top and bottom portions and a plurality of side apertures, the top portion of each section defining a top opening of a column section and the bottom portion of each section defining a bottom opening of a column section, the bottom portion of each section including a screen for containing inert support material within the section and for preventing roots from growing outside the section through the bottom opening of the section, the bottom portion of each section further including a screen support for supporting the screen at the bottom of the section and for supporting roots within the section, the top portion of each section being adapted to mate with and support a bottom portion of an adjacent section, the bottom portion of each section being adapted to mate with the top portion of an adjacent section;

(b) a nutrient reservoir for positioning above the column and adapted to contain a nutrient solution;

(c) a column cap having a passageway therethrough, the cap being adapted to mate with the top portion of the column top section and to cover the top opening of the column top section to restrict evaporation of nutrient solution therethrough;

(d) means for supporting the nutrient reservoir above the column cap; and (e) an adjustable valve having an inlet and an outlet for controlling the rate of introduction of nutrient solution into the column, the inlet of the valve being connected to the nutrient reservoir, the valve being mounted on the column cap by means including a hollow pipe at least a portion of which pipe is transparent, the pipe connecting the outlet of the valve with the passageway in the column cap to restrict evaporation of nutrient solution through the passageway in the column cap, the valve being adjustable to control regularly timed drips of nutrient solution into the column, the pipe permitting unrestricted passage of nutrient solution from the valve through the passageway in the cap to permit accurate timing of the drips of nutrient solution and gravity feed of nutrient solution into the column, the transparent portion of the pipe permitting visual inspection of the rate of introduction of nutrient solution from the valve into the column.

2. The system of claim 1 wherein the passageway in the cap is generally centrally located in the top of the cap.

3. The system of claim 1 further including means for collecting nutrient solution draining from the column through the bottom opening of the column.

4. The system of claim 1 further including means for supporting the column in a vertical position.

5. The system of claim 4 wherein the means for supporting the column comprises a base, the base including: a vertical cylindrical rim havng an inner diameter sized to complementarily fit around the outside of and mate with a bottom portion of the column; bearing means connected to the rim and protruding inwardly from a bottom of the rim for supporting the bottom portion of the column in mating position with the rim, the bearing means permitting drainage of nutrient solution therethrough from the column, and the rim and bearing means being adapted for supporting the column in a vertical position; and rim support means connected to the rim and extending outwardly therefrom, the support means adapted for supporting the cylindrical rim in a vertical position above a surface.

6. The system of claim 5 further including means for collecting nutrient solution exiting the column through the bottom opening of the column, the means for collecting the nutrient solution comprising a collection reservoir adapted to fit beneath the bottom opening of the column; wherein the rim support means include a plurality of legs extending downwardly and outwardly from the rim, the legs providing space for the collection reservoir beneath the rim and the bearing means, and the legs permitting access to the collection reservoir without changing the position of the rim and column relative to the surface; the collection reservoir and the legs being adapted to permit removal of the collection reservoir from a position beneath the bottom opening of the column to a position outside the rim support means without changing the position of the rim and column relative to the surface.

7. The system of claim 1 further including a mesh screen covering the bottom opening of each column section, the screen being adapted to prevent passage of support material outside the column section through the bottom opening of the column section, and the screen being further adapted to permit the passage of nutrient solution from inside the column to outside the column through a bottom opening of the column.

8. The system of claim 1 wherein the means for controlling the introduction of nutrient solution into the column further includes a nutrient solution dispersion conduit system, the conduit system comprising a nutrient collection container below said valve, and peripherally extending conduits for carrying nutrient solution from the nutrient collection container to said inert material.

9. The system of claim 1 further including vertical plant support cage sections of generally cylindrical shape having a diameter substantially larger than the cylindrical column sections and a vertical length about equal to the vertical length of a column section, the cage sections being adapted to be positioned outside the column sections and generally concentrically with the column sections, the cage sections being further adapted to support plant growth from the column sections and permit light to contact said plant growth.

10. The system of claim 9 wherein each cage section is separated from an adjacent cage section by a transparent disc.

11. The system of claim 1 further including a hollow support pipe mounted within each of said side apertures, the support pipes having outer diameters sized to fit complementarily within and mate with the side apertures, the support pipes extending horizontally from an outer wall of a column section to a position inside the column section.

12. The system of claim 1 including pump means for mixing fluid in the nutrient reservoir.

13. The system of claim 4 wherein said supporting means is a rotable column base.

* * * * *